US012061109B2

(12) United States Patent
Hernandez et al.

(10) Patent No.: US 12,061,109 B2
(45) Date of Patent: Aug. 13, 2024

(54) PORTABLE DEVICE, DISPENSING METHOD, RESERVOIR, AND SYSTEM INCLUDING SUCH A DEVICE AND RESERVOIR

(71) Applicants: Paul Hernandez, Venelles (FR); Didier Santo, Massanes (FR)

(72) Inventors: Paul Hernandez, Venelles (FR); Didier Santo, Massanes (FR)

( * ) Notice: Subject to any disclaimer, the term of this patent is extended or adjusted under 35 U.S.C. 154(b) by 1097 days.

(21) Appl. No.: 15/999,663

(22) PCT Filed: Feb. 20, 2017

(86) PCT No.: PCT/FR2017/050379
§ 371 (c)(1),
(2) Date: Aug. 20, 2018

(87) PCT Pub. No.: WO2017/141000
PCT Pub. Date: Aug. 24, 2017

(65) Prior Publication Data
US 2021/0039812 A1    Feb. 11, 2021

(30) Foreign Application Priority Data
Feb. 19, 2016 (FR) ...................... 1651356

(51) Int. Cl.
*G01G 13/08*     (2006.01)
*B65B 1/34*      (2006.01)
(Continued)

(52) U.S. Cl.
CPC ............. *G01G 13/08* (2013.01); *G01G 13/02* (2013.01); *G01G 13/06* (2013.01); *G01G 13/14* (2013.01);
(Continued)

(58) Field of Classification Search
CPC ........ G01G 13/08; G01G 13/02; G01G 13/06; G01G 13/14; G01G 13/285; G07F 13/04;
(Continued)

(56) References Cited

U.S. PATENT DOCUMENTS

| | | | | |
|---|---|---|---|---|
| 4,431,071 A | * | 2/1984 | Magat | ...................... G01N 9/02 |
| | | | | 177/149 |
| 4,723,614 A | * | 2/1988 | Lahti | ...................... G01G 11/08 |
| | | | | 222/413 |

(Continued)

FOREIGN PATENT DOCUMENTS

| | | |
|---|---|---|
| CN | 1950140 A | 4/2007 |
| CN | 101606045 A | 11/2007 |

(Continued)

OTHER PUBLICATIONS

ISR; European Patent Office; NL; May 12, 2017.

Primary Examiner — Octavia Davis Hollington
Assistant Examiner — Monica S Young
(74) Attorney, Agent, or Firm — Patshegen IP; Moshe Pinchas

(57) ABSTRACT

A mobile device (10) for measuring out at least one ingredient associated with a predetermined mass comprising:
means (105) for guiding into position opposite at least one reservoir comprising an ingredient to be measured out,
means (110) for reading an identifier of an ingredient on the reservoir comprising said ingredient,
motorized means (115) for delivering the ingredient to be measured out from the reservoir,
means (120) for acquiring a mass measurement of the ingredient,
control means (125), configured to activate the motorized means when the reservoir of the ingredient to be measured out is identified by the means for reading an identifier and the device is positioned opposite the
(Continued)

reservoir, until the mass of the ingredient acquired by the acquisition means is equal to the predetermined mass for the ingredient.

17 Claims, 4 Drawing Sheets

(51) Int. Cl.
| | |
|---|---|
| B65B 43/62 | (2006.01) |
| B65B 57/06 | (2006.01) |
| G01G 13/02 | (2006.01) |
| G01G 13/06 | (2006.01) |
| G01G 13/14 | (2006.01) |
| G07F 11/28 | (2006.01) |
| G07F 11/44 | (2006.01) |
| G07F 13/04 | (2006.01) |

(52) U.S. Cl.
CPC ............... *B65B 1/34* (2013.01); *B65B 43/62* (2013.01); *B65B 57/06* (2013.01); *G07F 11/28* (2013.01); *G07F 11/44* (2013.01); *G07F 13/04* (2013.01)

(58) Field of Classification Search
CPC ...... G07F 11/44; G01F 11/28; B65B 2220/14; B65B 57/06; B65B 43/62; B65B 1/34
USPC .................................................. 177/116, 114
See application file for complete search history.

(56) References Cited

U.S. PATENT DOCUMENTS

| | | | | |
|---|---|---|---|---|
| 5,738,153 | A * | 4/1998 | Gerling | A01M 7/0092 |
| | | | | 137/552 |
| 6,056,027 | A * | 5/2000 | Patterson | B65B 1/32 |
| | | | | 141/370 |
| 6,170,718 | B1 * | 1/2001 | Ziegler | G01F 11/40 |
| | | | | 222/450 |
| 6,325,113 | B1 * | 12/2001 | Hathaway | B65B 1/32 |
| | | | | 141/94 |
| 6,600,110 | B1 * | 7/2003 | Thadani | G01G 1/18 |
| | | | | 177/126 |
| 8,176,947 | B2 | 5/2012 | Frei et al. | |
| 9,052,228 | B2 * | 6/2015 | Sollazzo Lee | G01F 11/24 |
| 2001/0027823 | A1 * | 10/2001 | Luchinger | G01G 13/024 |
| | | | | 222/408 |
| 2004/0155069 | A1 * | 8/2004 | Fontaine | G01F 13/005 |
| | | | | 222/196 |
| 2005/0269367 | A1 | 12/2005 | Post | |
| 2008/0072993 | A1 * | 3/2008 | Luchinger | B65B 3/30 |
| | | | | 141/18 |
| 2008/0190518 | A1 | 7/2008 | Luechinger et al. | |
| 2010/0051648 | A1 * | 3/2010 | Luchinger | G01G 23/3728 |
| | | | | 222/227 |
| 2010/0300181 | A1 | 12/2010 | Zech et al. | |
| 2013/0126041 | A1 * | 5/2013 | Bailey | B65B 1/32 |
| | | | | 141/98 |
| 2013/0334247 | A1 * | 12/2013 | Lee | G01F 11/24 |
| | | | | 222/77 |
| 2015/0021364 | A1 * | 1/2015 | Zehnder | G01F 13/001 |
| | | | | 222/504 |
| 2019/0124933 | A1 * | 5/2019 | Hamon | A21C 9/04 |

FOREIGN PATENT DOCUMENTS

| | | |
|---|---|---|
| CN | 101153815 B | 4/2008 |
| CN | 101246037 B | 8/2008 |
| CN | 102209886 A | 10/2011 |
| EP | 0 618 426 A1 | 10/1994 |
| EP | 0618426 A1 | 10/1994 |
| EP | 1 930 702 A1 | 6/2008 |
| EP | 1930702 A1 | 6/2008 |
| EP | 2 826 722 A1 | 1/2015 |
| EP | 2826722 A1 | 1/2015 |
| JP | 62249019 A | 10/1987 |
| WO | 2007/090665 A1 | 8/2007 |
| WO | 2007090665 A1 | 8/2007 |

* cited by examiner

PORTABLE DEVICE, DISPENSING METHOD, RESERVOIR, AND SYSTEM INCLUDING SUCH A DEVICE AND RESERVOIR

TECHNICAL FIELD OF THE INVENTION

The present invention relates to a mobile measuring device, a reservoir comprising an ingredient to be measured out by such a device, a measuring system comprising such a device and such a reservoir, and a measuring method.

It is applied, in particular, to the field of measuring out and mixing a large number of powdered ingredients.

STATE OF THE ART

To date, there are two methods for measuring out powdered ingredients, the manual method which consists of measuring out the powdered ingredients by hand onto a weighing scale with a display, and another method which consists of having several hoppers, each equipped with delivery elements, which functions automatically.

The manual method is inexpensive but demanding for the operator, with risk of errors and not much traceability.

The second is very expensive, but can be used for a number of ingredients, and ensures good traceability.

AIM OF THE INVENTION

The present invention aims to overcome all or some of these disadvantages.

To this end, according to an initial aspect, the present invention aims for a mobile measuring device for at least one ingredient associated with a predetermined mass, which comprises:
 means for guiding into position opposite at least one reservoir comprising an ingredient to be measured out,
 means for reading an identifier of an ingredient on the reservoir comprising said ingredient,
 motorized means for delivering the ingredient to be measured out from the reservoir,
 means for acquiring a mass measurement of the ingredient,
 control means configured to activate the motorized means when the reservoir of the ingredient to be measured out is identified by the reading means of an identifier and the device is put into position opposite the reservoir, until the mass of the ingredient acquired by the acquisition means is equal to the predetermined mass for the ingredient.

Thanks to these provisions, the device can be moved easily by a user between different reservoirs comprising the ingredients to be measured out. In addition, the means for reading an identifier enable a verification that the user has the device for measuring out to the reservoir comprising the correct ingredient.

Also, the mass of the ingredient being continuously measured, errors regarding the mass of the ingredient measured out are contained in a range of tolerance defined beforehand.

The device can thus measure out an ingredient, once positioned on the suitable reservoir, without requiring any control on the part of a user.

Finally, the motorized means on the device enable to avoid equipping each reservoir comprising an ingredient with motorized means. The production of each reservoir is therefore less expensive.

In the embodiments, the device that is the subject of the present invention comprises at least two containers for receiving each ingredient to be measured out, and the control means are configured to activate, at each change of container, the motorized means when the reservoir of the ingredient to be measured out is opposite the reservoir, until the mass of the ingredient acquired by the acquisition means is equal to the predetermined mass for the ingredient.

Thanks to these provisions, once the device is connected to a reservoir, several containers can be filled for a production in series, according to the acquired mass.

In the embodiments, the device that is the subject of the present invention, comprises means for reading an identifier of a container and each container comprises an identifier.

The advantage of these embodiments is to prevent the inadvertent filling of a container twice, if for example the container is replaced on the device.

In the embodiments, the device that is the subject of the present invention comprises wireless communication means configured to receive at least one predetermined mass.

These implementation modes enable the predetermined masses to be modified remotely by a user.

In the embodiments, the device that is the subject of the present invention comprises means for displaying at least one predetermined mass and/or at least one identifier of the ingredient to be measured out.

The advantage of these embodiments is to enable a user to verify the quantities measured out by the device, as well as the name of the ingredient to be measured out.

In the embodiments, the measuring of the mass by the acquisition means is set to zero before the implementation of the motorized means.

These embodiments have the advantage of obtaining, for each ingredient, the mass actually poured once the ingredient has been measured out.

In the embodiments, the motorized means comprise a motor of which the speed is in accordance with the difference between the mass acquired and the predetermined mass of the ingredient.

Thus, the closer the mass acquired is to the predetermined mass of the ingredient, the more the motor slows down so as to have a specific measurement of the ingredient. These embodiments enable to obtain a flow for the delivery of the ingredient which is proportional to the quantity to be delivered.

In the embodiments, the means for reading an identifier induce an electromagnetic field.

Thanks to these provisions, the device can interact with an identifier support on the reservoir such as an RFID ("Radio Frequency Identification") chip or an NFC ("Near Field Communication") tag, for example.

In the embodiments, the device that is the subject of the present invention additionally comprises a rail, arranged opposite at least one reservoir, the rail comprising means for moving the device over the rail.

According to a second aspect, the present invention aims for a reservoir comprising an ingredient to be measured out by a device that is the subject of the present invention, which comprises:
 means for holding in position the device corresponding to the means for guiding the device,
 means for delivering of the ingredient to be measured out activated by the motorized delivery means of the device,
 an identifier support for the ingredient contained by the reservoir corresponding to the reading means of the device.

Thanks to these provisions, the reservoir is passive and does not comprise any motorized means. The production cost of such a reservoir is therefore decreased. In addition, each reservoir identifies ingredient contained by the reservoir such that the ingredient measured out is indeed the correct ingredient to be measured out.

In the embodiments, the delivery means comprise a worm screw, which can be rotated by the motorized delivery means of the device.

The advantage of these embodiments is to be able to precisely measure out the ingredient.

In the embodiments, the delivery means comprise a vibration means, activated by the motorized delivery means of the device.

These embodiments enable to evenly distribute the ingredient in the reservoir to have an even delivery of the ingredient.

In the embodiments, the delivery means comprise means for fluidizing the ingredient.

The advantage of these embodiments is to avoid possible agglomeration of a powdered ingredient which could create errors during measuring.

In the embodiments, the identifier support comprises an electronic tag activated by an electromagnetic field.

These embodiments enable the reading means of the device to interact remotely with the identifier support of the reservoir.

According to a third aspect, the present invention aims for a measuring system of at least one ingredient comprising at least one reservoir that is the subject of the present invention and at least one device that is the subject of the present invention.

With the specific aims, advantages and characteristics of the system that is the subject of the present invention being similar to those of the device and of the reservoir that are the subject of the present invention, they are not repeated here.

In the embodiments, only the device is powered by electric current.

These embodiments enable to make all the elements other than the device, passive. It is, for example, the case with the reservoirs, which do not require any power supply.

According to a fourth aspect, the present invention aims for a method for measuring out at least one ingredient associated with a predetermined mass by means of a system that is the subject of the present invention, which comprises the following steps:
 the guiding into position of a device opposite at least one reservoir comprising an ingredient to be measured out.
 the reading of an identifier of an ingredient on the reservoir comprising said ingredient,
 the delivery of the ingredient to be measured out from the reservoir,
 the acquisition of a mass measurement of the ingredient,
 the activation of the motorized means of the device when the reservoir of the ingredient to be measured out is identified by reading means of an identifier of the device and the device is positioned opposite the reservoir, until the mass of the ingredient acquired by the acquisition means is equal to the predetermined mass for the ingredient.

With the specific aims, advantages and characteristics of the method that is the subject of the present invention being similar to those of the device, of the reservoir and of the system that are the subject of the present invention, they are not repeated here.

BRIEF DESCRIPTION OF THE FIGURES

Other specific advantages, aims and characteristics of the invention will emerge in the following non-limiting description of at least one specific embodiment of the device, of the reservoir, of the system and of the method that are the subject of the present invention, opposite the appended drawings, wherein.

DESCRIPTION OF EXAMPLES OF EMBODIMENTS OF THE INVENTION

The present description is given in a non-limiting manner, each characteristic of an embodiment could be combined advantageously with any other characteristic of any other embodiment. Moreover, each parameter of an example of an embodiment can be implemented independently of other parameters of said example of an embodiment.

It is noted, that the figures are not to scale.

Figure 1:
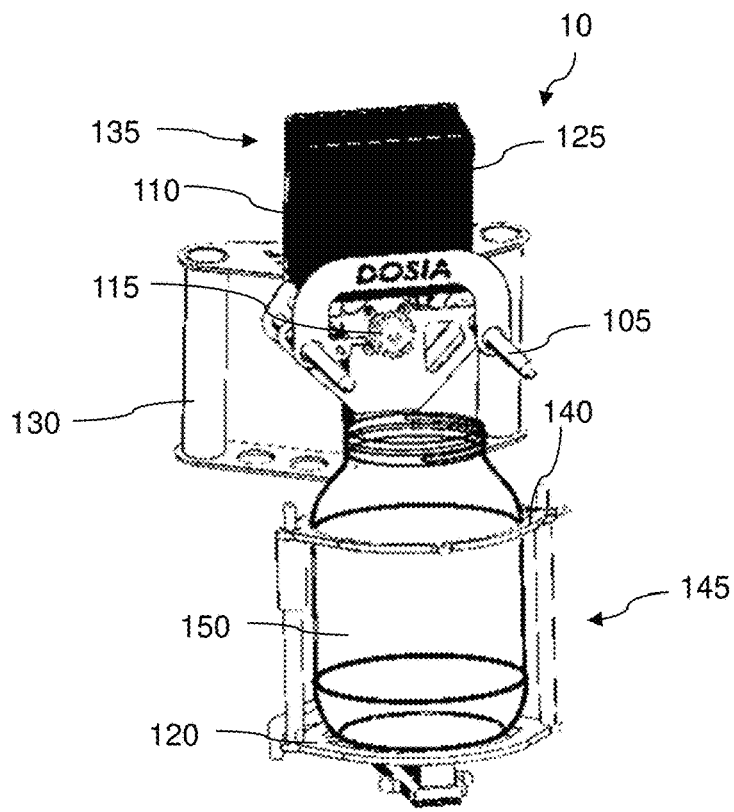
FIG. 1 represents, schematically and in perspective, a first specific embodiment of the device that is the subject of the present invention.

In FIG. 1, which is not to scale, a schematic view of an embodiment of the device 10 that is the subject of the present invention is observed.

The mobile device 10 for measuring out at least one ingredient associated with a predetermined mass comprises means 105 for guiding into position opposite at least one reservoir 20 comprising an ingredient to be measured out. The device 10 comprises a chassis. The guiding means 105 are attached to the chassis.

The means 105 for guiding into position are at least one elevation being interlocked with a corresponding elevation 205 on the reservoir 20. Preferably, the guiding means 105 are two parallel axis rods. The means 105 for guiding into position are such that the container 150 of the device 10 is supported in a substantially horizontal position.

Preferably, the means 105 for guiding into position comprise a contact length, for example, the axis of the rods, in the case of rods. The contact length is such that the device is supported by the container 20 when the guiding means 105 are inserted into the corresponding means 205 of the reservoir 20.

Preferably, the means 105 for guiding into position prevent any rotation of the device 10 with respect to the reservoir. For example, the means 105 for guiding into position form a sliding type mechanical connection between the device 10 and the reservoir 20.

The device 10 comprises means 110 for reading an identifier of an ingredient on the reservoir 20 containing said ingredient. The identifier of an ingredient can comprise, an identification number, a name of the ingredient, a chemical composition of the ingredient, for example. The reading means 110 are attached to the chassis.

The means 110 for reading the identifier of the ingredient correspond to the identifier support 215 of the reservoir 20. Preferably, the means 110 for reading the identifier preferably induce an electromagnetic field according to the standard ISO/CEI 14443. The means 110 for reading the identifier can be an RFID ("Radio Frequency Identification") chip or an NFC ("Near Field Communication") reader. In these embodiments, the identifier support 215 of the reservoir 20 comprises a chip containing the identifier and an antenna.

In other embodiments, the reading means 110 are a barcode or a two-dimensional barcode reader (commonly called a QR-code ("Quick Response Code") or 'datamatrix', registered trademark). In these embodiments, the identifier support 215 is a barcode or a two-dimensional barcode.

In other embodiments, the reading means 110 are an image sensor recognizing characters. In these embodiments, the identifier support 205 is a label, printed and arranged on the reservoir 20.

The device 10 comprises motorized means 115 for delivering the ingredient to be measured out from the reservoir 20. The motorized means 115 comprise a motor and an elevation being interlocked with a corresponding elevation, on the reservoir 20. The elevation is mobile in rotation, along an axis, with respect to the device 10. The elevation is rotated by the motor. The motor for the motorized means is attached to the chassis. Preferably, the motor has a rotation speed of between zero and one hundred and twenty rotations per minute.

Preferably, the elevation is a shaft comprising slots and the corresponding elevation on the reservoir 20, is a hub comprising corresponding slots. In other embodiments, the elevation is a hub comprising slots and the corresponding elevation, on the reservoir 20, is a shaft comprising corresponding slots. The coupling of the slots of the shaft and of the hub enable a power transmission.

In the embodiments wherein the guiding means 105 are two parallel axis rods, the rotation axis of the elevation is parallel to the axes of the rods and situated equidistantly from the axes of the rods. These embodiments enable to distribute the forces due to the actuation of the motorized means 115 evenly over each rod.

The motorized means 115 and the guiding means 105 are situated one same surface of the device 10. Preferably, the reading means 110 are situated on one side of said face.

The device 10 comprises means 120 for acquiring a mass measurement of the ingredient. The means 120 for acquiring a mass measurement of the ingredient are preferably situated protruding from another side of said face. The means 120 for acquiring a mass are scales. The scales are preferably electronic scales, with one part of the scales attached to the chassis of the device 10 and the other mobile, and placed under the container 150.

In the preferable embodiments, the acquisition means 120 are such that an opening of the container 150 is situated under an opening for delivering an ingredient from the reservoir 20. The dimensions between the acquisition means 120 is the motorized means 115, and the means 105 for guiding into position are greater than the dimensions of the container 150.

Preferably, the device 10 comprises means 140 for holding the container 150 in position. The means 140 for holding the container 150 in position are an elevation surrounding at least partially the container 150. The means 140 for holding in position are attached to the chassis and situated between the acquisition means 120 and the means 105 for guiding into position or the motorized means 115.

The means 140 for holding in position can be configured to hold containers 150 in the form of sachets or pots in position.

The device 10 comprises control means 125, configured to activate the motorized means 115 when the reservoir 20 of the ingredient to be measured out is identified by the means 110 for reading an identifier and the device 10 is positioned opposite the reservoir 20, until the mass of the ingredient acquired by the acquisition means 120 is equal to the predetermined mass for the ingredient.

The device 10 can suitably measure out an ingredient once it is positioned on the reservoir 20 without requiring any control on the part of a user.

The control means 125 are preferably a microprocessor comprising at least one computer program. In the embodiments, with each change of container 150, the position of the device 10 remains unchanged, the motorized means 115 are activated by the control means 125. The motor of the motorized means 115 has a rotation speed controlled by the means for controlling the acquired mass 7. The speed of the motor of the motorized means 115 is in accordance with the difference between the acquired mass and the predetermined mass of the ingredient.

Thus, the closer the acquired mass is to the predetermined mass of the ingredient, the slower the motor is, so as to have a specific measuring out of the ingredient. These embodiments enable to obtain a delivery flow that is proportional to the quantity to be delivered.

In the embodiments, the guiding means 105 comprise a positioning sensor. The positioning sensor can be an induction type sensor, activated by the means 205 for holding the reservoir 20 in position, for example. Preferably, the positioning sensor detects that the device 10 is suitably positioned in a reservoir 20.

In the embodiments, the device 10 comprises means 145 for reading an identifier of a container 150 and each container 150 has an identifier. The identifier of a container 150 can comprise, an identification number, a name of the ingredient, or a chemical composition of the ingredient, for example. The reading means 145 are attached to the chassis.

The means 145 for reading the identifier of the ingredient correspond to the identifier support of the container 150. Preferably, the means 145 for reading the identifier preferably induce an electromagnetic field, according to the standard ISO/CEI 14443. The means 145 for reading the identifier can be an RFID ("Radio Frequency Identification") chip reader, or an NFC ("Near Field Communication") reader. In these embodiments, the identifier support of the container 150 comprises a chip containing the identifier and an antenna.

In other embodiments, the means 145 for reading are a barcode or two-dimensional barcode reader (commonly named QR-code ("Quick Response Code") or 'datamatrix', registered trademark). In these embodiments, the identifier support is a barcode or a two-dimensional barcode.

In other embodiments, the reading means 145 are an image sensor, recognizing characters. In these embodiments, the identifier support is a label, printed and arranged on the container 150.

Preferably, the control means 125 comprise the means for comparing the acquired mass with the predetermined mass.

In the embodiments, the device 10 comprises wireless communication means, configured to receive at least one predetermined mass. Preferably, the wireless communication means are communication means according to the protocol IEEE 802.11 (or Wi-fi, registered trademark) or by Bluetooth (registered trademark).

Preferably, the device 10 can send information on the mass measurement of each ingredient acquired by the acquisition means 210 to the communicating terminal. These embodiments enable a better traceability for each mixture.

The device 10 comprises means for storing a predetermined mass and an identifier of an ingredient to be captured, connected to the control means 125.

In the embodiments, the device 10 comprises means for displaying 135 at least one predetermined mass and/or at least one identifier of the ingredient to be measured out. The display means 135 are a screen, for example.

In the embodiments, the device 10 comprises manual control means. Said manual means can comprise any type of man-machine interface known to a person skilled in the art.

In the embodiments, the device 10 communicates, by means of wireless communication means with a communicating terminal. The communicating terminal sends to the device 10, information relating to:
- an identifier of each reservoir 20 to which the device 10 must be coupled in order to receive an ingredient,
- the quantities of each ingredient to be measured out, in the form of a predetermined mass,
- the order wherein the ingredients must be measured out, and
- for example, an indication of the tolerance relating to the predetermined mass of each ingredient.

The display means 135 can display all or some of the communicated information. The manual control means are configured to validate, select, or cancel, the displayed controls on the display means 135, for example.

Preferably, the device 10 comprises an autonomous power source supplying the motorized means 115, the means for acquiring a mass measurement 120 the control means 125, the display means 135, the reading means 110 and any other component of the device 10 requiring an electricity supply.

Preferably, the control means 125 are positioned on the side of the face opposite the side comprising the guiding means 105.

In the embodiments, the side comprising the control means 125 also comprises handles 130 for handling the device. Preferably, the handles 130 are evenly distributed around the axis of the motorized means 115.

In the embodiments, the measurement of mass of the acquisition means 120 is set to zero before implementing the motorized means 115. This calibration enables only to determine the mass of the new ingredient dispensed into the recipient 150.

In the embodiments, the device 10 further comprises a rail 600, arranged opposite at least one reservoir 20, the rail 600 comprising the means for moving the device over the rail 600. The rail 600 comprises means for positioning at least one reservoir 20 with respect to the rail 600. The positioning means are, for example, a clamp attached with respect to the rail 600 wherein a reservoir 20 is inserted. The movement means are, for example, a step motor for which the position of each reservoir 20 has been previously recorded in the control means. In other embodiments, the positioning of each reservoir 20 is identified by an actuator, such as an electrical contact activated when the device 10 is in position in the rail 600 opposite a reservoir 20. The reservoir 20 is then identified by the identifier of the ingredient on the reservoir 20. The device 10 is, for example, attached on a platform on the rail 600, the platform being connected to the movement means by a helical connection, such as a worm screw.

Figure 6:
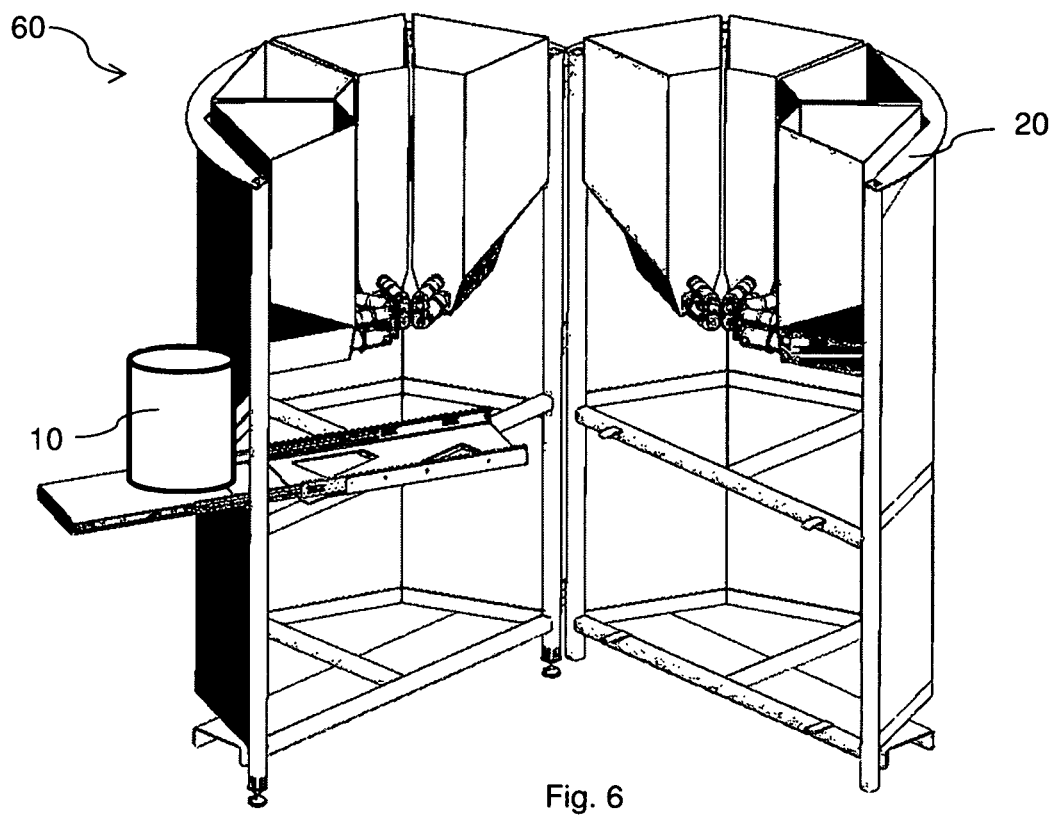
FIG. 6 represents, schematically and in perspective, a third specific embodiment of the system that is the subject of the present invention
Figure 7:
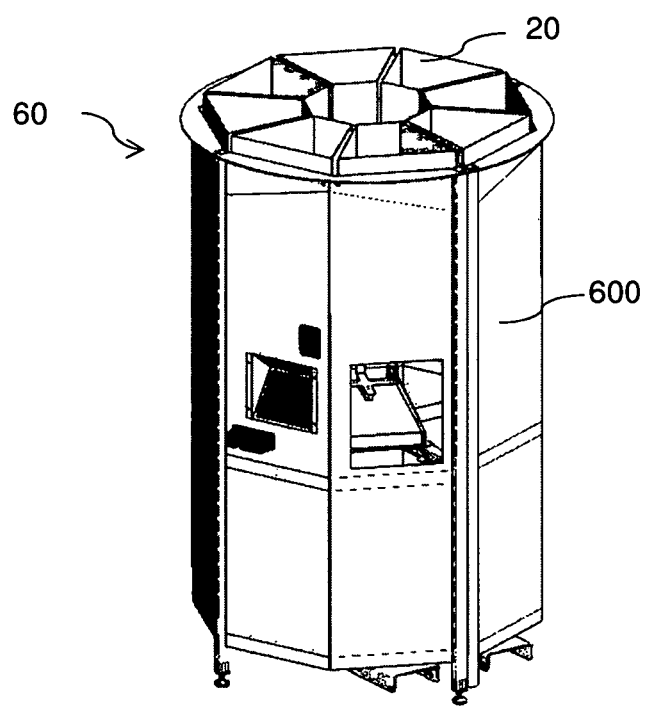
FIG. 7 represents, schematically and according to a second perspective, the third specific embodiment of the system that is the subject of the present invention.

FIGS. 6 and 7 represent a system 60 that is the subject of the present invention comprising 8 reservoirs 20 and one rail 600. The reservoirs 20 are arranged in the periphery of the device 10. The device 10 is turned to be opposite the suitable reservoir 20.

Figure 2:
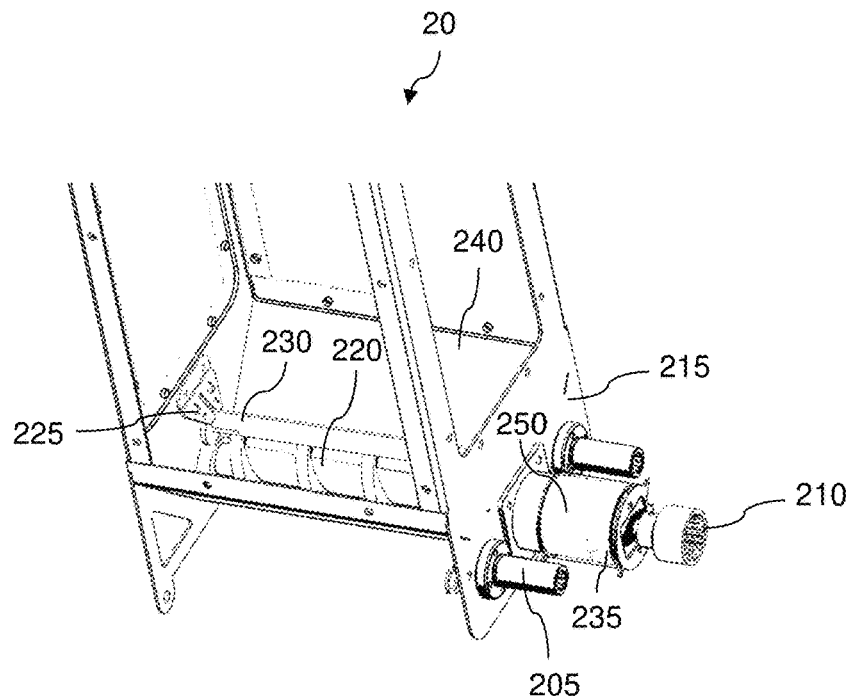
FIG. 2 represents, schematically and in perspective, a first specific embodiment of the reservoir that is the subject of the present invention.

It is observed, in FIG. 2, a specific embodiment of a reservoir 20 that is the subject of the present invention.

The reservoir 20 comprises an ingredient to be measured out by a device 10. The container 20 is of a substantially parallelepiped rectangular shape. The sides of the longest length are substantially vertical under operating conditions of the reservoir 20. One substantially horizontal face comprises a removable opening. The other substantially horizontal face comprises two tilted flaps 240. The angle of inclination of the tilted flaps 240 is preferably between thirty and sixty degrees. The tilted flaps 240 have an intersection in the middle of the face and such that the intersection is farther from the center of gravity of the reservoir than the center of gravity of the surface comprising the intersections of the tilted flaps 240 with the parallelepiped.

Under the operating conditions of the reservoir 20, the opening of the reservoir is substantially horizontal and the tilted flaps 240 are situated closer to the ground than the opening, such that the ingredient contained in the container pours out, under the effect of gravity, from the opening towards the intersection of the tilted flaps 240. The volume defined by the parallelepiped, the opening and the tilted flaps 240 is the volume wherein is inserted the ingredient to be delivered.

The reservoir 20 comprises means 205 for holding the device 20 corresponding to the guiding means 105 of the device 10 in position. Preferably, the means 205 for holding in position are at least one elevation being interlocked with a corresponding elevation 105 on the device 10. Preferably, the reservoir 20 comprises as many elevations for holding in position 205 as the device 10 comprises guiding elevations 105.

Preferably, the means 205 for holding in position are two through bores of parallel axes. The means 205 for holding in position are such that the container 150 of the device 10 is supported in a substantially horizontal position. Preferably, the through bores cross through a face of the reservoir 20 without creating an opening between the volume wherein is inserted the ingredient to be delivered.

Preferably, the means 205 for holding in position comprise a contact length, for example, along the axis of the rods, in the case of rods. The contact length is such that the device 10 is supported by the container 20 when the guiding means 105 are inserted into the means 205 of holding the reservoir 20 in position.

Preferably, the means 205 for holding in position, prevent any rotation of the device 10 with respect to the reservoir 20. For example, the means 105 guiding into position interlocked with the means 205 for holding in position form a sliding type mechanical connection between the device 10 and the reservoir 20.

Preferably, the bores are situated on a face of the normal reservoir at the axis of the intersection of the tilted flaps 240.

The reservoir 20 comprises means for delivering 210 the ingredient to be measured out, activated by the motorized delivery means 115 of the device 10.

Preferably, the delivery means 210 are situated between the two bores equidistantly from each bore 205. The delivery means 210 are connected by an opening to the volume wherein the ingredient to be delivered is inserted.

The delivery means 210 comprise at least one elevation being interlocked with a corresponding elevation, on the motorized means 115 of the device 10. The elevation is mobile in rotation, along an axis, with respect to the reservoir 20. The axis of rotation is parallel to the axis of the intersection of the tilted flaps 240. In addition, a point of the axis of rotation is aligned with the center of gravity of the parallelepiped and a point of the axis of intersection of the tilted flaps 240. The elevation is rotated by the motor of the motorized means 115 of the device 10.

Preferably, the elevation is a hub comprising slots corresponding to the slots of a shaft of the motorized means 115. In other embodiments, the elevation is a shaft comprising slots and the corresponding elevation, on the device 10, is a hub comprising corresponding slots. The coupling of the slots of the shaft and the hub enables the transmission of power.

The elevation creates an opening in the face on which are situated the delivery means 210.

In the preferable embodiments, the hub rotated by the motorized means 115 is connected by a worm screw 220. The delivery 210 comprise the worm screw 220 in the axis of rotation of the motorized means 115, rotated by the motorized delivery means 115 of the device 10. Preferably, the motorized means 115 are rotated along the anti-clockwise direction, facing the face comprising the delivery means 210, if the worm screw has a right-hand thread, and along the clockwise direction if the worm screw 220 has a left-hand thread.

Preferably, the thread of the worm screw 220 is tangential to the tilted flaps 240. The worm screw 220 is of a greater length to the intersection segment of the tilted flaps 240. Such that, when the worm screw 220 is rotated, the ingredient is conveyed in a circular section tube 250 comprising an opening through which the ingredient falls under gravity into the container 150.

In the embodiments, the delivery means 210 comprise vibration means, 225 and 230, activated by the motorized delivery means 115 of the device 10.

The vibration means, 225 and 230, comprise a plate 230, tangential to the thread of the worm screw 220 comprised in a normal plane to the face comprising the delivery means 210 and comprising the axis of intersection of the tilted flaps 240. The plate 230 is longitudinal to the axis of intersection of the tilted flaps 240 and of a dimension substantially equal to the length of the intersection segment of the tilted flaps 240. The plate 230 is attached along one end to the face of the parallelepiped comprising the delivery means 210 and comprises, at the other end, a disc in contact with the worm screw 220. The attachment is a spherical connection.

In the embodiments, the vibration means, 225 and 230, are the delivery means 210 and comprise a vibrating tilted plate to release an ingredient.

Preferably, the worm screw 220 comprises a cam in contact with the disc of the plate 230.

The face opposite the face comprising the delivery means 210 comprises a guide 225 comprising a longitudinal opening wherein the plate is inserted.

Thus, by rotation of the motorized means 115, the worm screw is rotated and the end of the plate 230 is moved in the guide 225 moving the ingredient into the reservoir and avoiding the surging of the ingredient. The rotation speed of the motorized means 115 therefore creates shocks by means of the plate 230 and the guide 225.

Preferably, the delivery means 210 comprise means for fluidizing 235 the ingredient. Preferably, the means for fluidizing 235 the ingredient are at least one claw 235 attached to the axis of the worm screw 220 in the tube 250. Each claw 235 enables to grate the compact ingredient conveyed by the worm screw 220 into the tube 250 and to break up any possible agglomerations.

In the embodiments, the tube 250 comprises a shutter opened by the delivery means 210 during the rotation of the motorized means 115. The shutter is closed when the rotation of the motorized means 115 stops. The shutter enables to avoid, during the positioning of the device 10 on a reservoir 20 not comprising the ingredient to be measured out, any partial delivery of the ingredient. Preferably, the shutter is arranged at the opening of the tube 250 through which the ingredient falls under the effect of gravity into the container 150. The shutter is opened just before the delivery, and closed just after. Such embodiments avoid an ingredient falling into the container during the berthing, also called the positioning of the device 10 on the reservoir 20, and the phase of withdrawing the device 10 from the reservoir 20.

The shutter can be a tube concentric to the tube 250, such that the interior diameter of the shutter is substantially equal to the exterior diameter of the tube 250. The shutter is in sliding connection with the tube 250. The actuation of the motorized means 115 slides the shutter over the tube 250 and releases the opening of the tube 250.

The reservoir 20 comprises an identifier support 215 of the ingredient contained by the reservoir 20 corresponding to the reading means 110 of the device 10.

Preferably, the identifier support 215 is situated on the face comprising the delivery means 210. The identifier of an ingredient can comprise, an identification number, a name of the ingredient, a chemical composition of the ingredient, for example.

Preferably, when the means 110 for reading the identifier preferably induce an electromagnetic field, according to the standard ISO/CEI 14443, the identifier support 215 comprises an electronic tag activated by an electromagnetic field, such as an NFC or RFID tag.

In other embodiments, the reading means 110 are a barcode reader or a two-dimensional barcode reader (commonly called QR-code ("Quick Response Code" or datamatrix, registered trademark)). In these embodiments, the identifier support 215 is a barcode or a two-dimensional bar code.

In other embodiments, the reading means 110 are an image sensor, recognizing characters. In these embodiments, the identifier support 215 is a label, printed and placed on the reservoir 20.

Figure 3:
FIG. 3 represents, schematically and in perspective, a first specific embodiment of the system that is the subject of the present invention.

An embodiment of a system 30 for delivering at least one ingredient comprising a reservoir 20 and a device 10 is observed in FIG. 3. On the embodiment of the system represented in FIG. 4, the means 105 for guiding into position of the device 10 are inserted in the means 205 for holding the reservoir 20. The reservoir 20 is identified by the reading means 110 and the motorized means 115 are interlocked with the delivery means 210 of the reservoir 20.

In the embodiments, only the device 10 is powered by electric current.

These embodiments enable to make all the elements, other than the device 10, passive. This is, for example, the case with the reservoirs 20 which do not require any power.

It is noted here, that the device 10 is referred to as "active" since the device 10 comprises the motor elements for delivering the ingredient. In addition, the reservoir 20 is referred to as "passive" since without activation by means of the device 10, the ingredient is not delivered.

Figure 4:
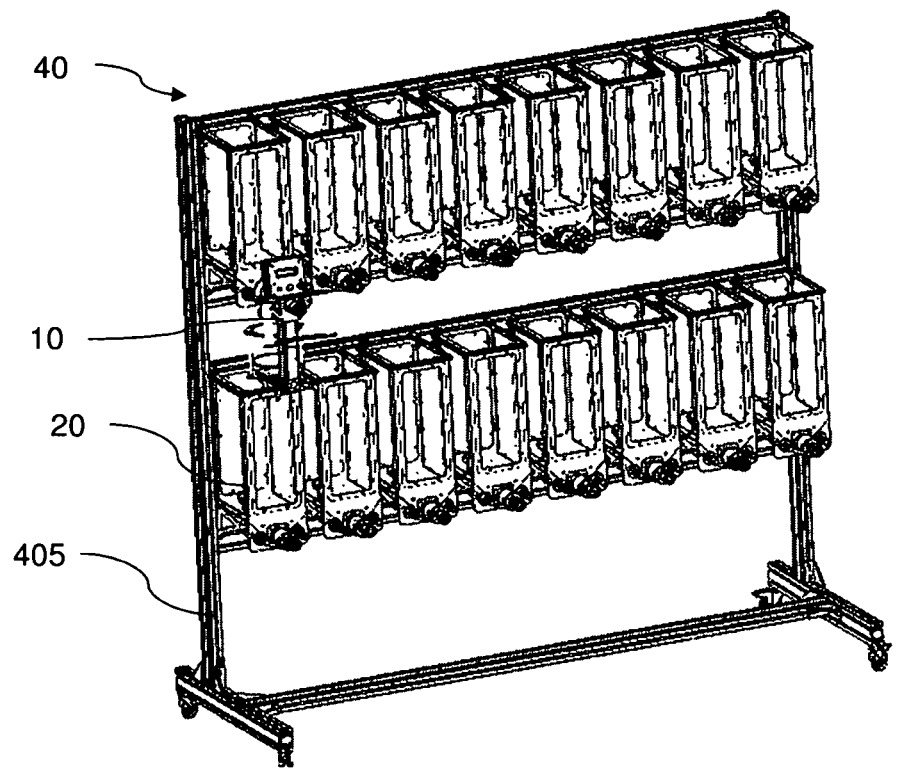
FIG. 4 represents, schematically and in perspective, a second specific embodiment of the system that is the subject of the present invention.

An embodiment of a system 40 for measuring out at least one ingredient comprising several reservoirs 20 and a device 10 is observed in FIG. 4. The reservoirs 20 are distributed in two lines on a shelf 405. The shelf 405 comprises eight reservoirs 20 per line.

On the embodiment of the system 40 represented in FIG. 4, the means 105 for guiding into position of the device 10 are inserted into the means 205 for holding a reservoir 20. The reservoir 20 is identified by the reading means 110 and the motorized means 115 are interlocked with the delivery means 210 of the reservoir 20.

Figure 5:
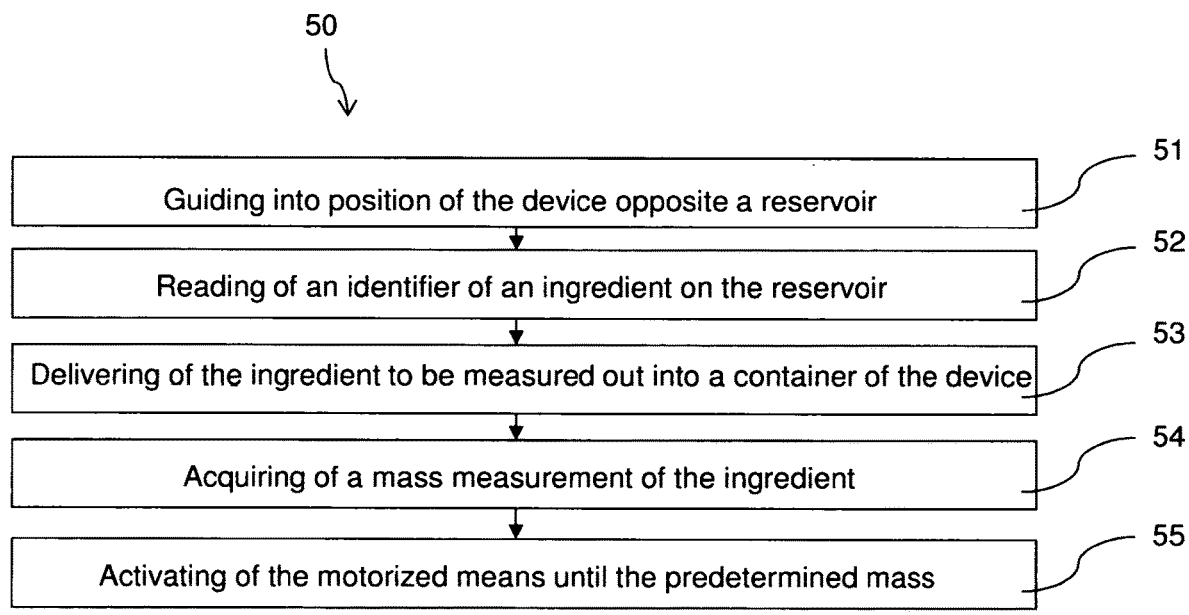
FIG. 5 represents, schematically and in the form of a flowchart, a succession of specific steps of the method that is the subject of the present invention.

A process 50 for measuring out at least one ingredient associated with a predetermined mass by means of a system 30 or 40 is observed in FIG. 5, which comprises the following steps:
- the guiding 51 into position of a device 10 opposite at least one reservoir 20 comprising an ingredient to be measured out.
- the reading 52 of an identifier of an ingredient on the reservoir 20 comprising said ingredient,
- the delivery 53 of the ingredient to be measured out from the reservoir 20,
- the acquiring 54 of a mass measurement of the ingredient,
- the activating 55 of the motorized means of the device 10 when the reservoir 20 of the ingredient to be measured out is identified by the means 110 for reading an identifier of the device 10 and the device 10 positioned opposite the reservoir 20, until the mass of the ingredient acquired by the acquisition means 120 becomes equal to the predetermined mass for the ingredient.

Preferably, the steps of method 50 are carried out in the order as indicated above.

Preferably, prior to the guiding step 51, a step of communicating between the communicating terminal and the device 10 has been implemented. During this stage, the communicating terminal sends to the device 10, information, recorded by a memory of the control means 125, relating to:
- an identifier of each reservoir 20 to which the device 10 must be coupled in order to receive an ingredient,
- the quantities of each ingredient to be measured out, in the form of a predetermined mass,
- the order wherein the ingredients must be measured out, and
- an indication of the tolerance relating to the predetermined mass of each ingredient, for example.

The method 50 can also comprise a display step, for all or some of the information communicated on the display means 135 of the device 10.

During the guiding step 51, a user handles the device 10 until the interlocking of the guiding means 105 of device 10 with the means 205 for holding the reservoir. The method 50 can comprise a step of detecting the holding in position of the device 10. As long as the positioning and the holding in position have not been detected, by a presence sensor, for example, the method displays a message indicating to a user that the device 10 is incorrectly positioned with respect to the reservoir 20, for example.

Once the guiding step has been carried out, a step 52 of reading an identifier of an ingredient on the reservoir 20 comprising said ingredient is carried out by the reading means 110 of the device 10. The reading means 110 read an identifier support 215 on the reservoir 20.

If the read identifier corresponds to the recorded identifier and subsequently in the order recorded by the control means 125, the control means move to the delivery step 53, the acquisition step 54 and the activation step 55. Otherwise, a message indicating that the reservoir does not correspond to the reservoir delivering the ingredient for measuring out, is displayed on the display means 135.

The steps of delivery 53, acquisition 54 and activation 55 are implemented simultaneously. Thus, the activation step 55 is implemented, the delivery 53 of the ingredient therefore takes place, until the mass of the ingredient acquired by the acquisition means 120, during the acquisition step 24, is equal to the predetermined mass for the ingredient.

The activation step is stopped when the mass acquired during the acquisition step is within the limits defined by a range of tolerance around the predetermined mass for said ingredient.

In the embodiments, before each activation step 55, a step 54 for acquiring the mass on the acquisition means 120, leads to the resetting to zero, by a tare, of the measurement of mass of the acquisition means 120. The method 50 can comprise a step for the resetting to zero of the mass measurement.

In the embodiments, a user can change the container 150 once the activation step 55 is stopped. In these embodiments, the user indicates to the control means, to again carry out the steps of delivery 53, acquisition 54 and activation 55 for the new container 150 and the same ingredient. The step of indicating to the control means can be implemented by manual control means.

The invention claimed is:

1. A mobile device for measuring out of at least one ingredient from a connected reservoir, said mobile device comprises:
   a guiding rod having a first axis for slidably engaging into a guiding bore of the reservoir creating a sliding type mechanical connection along said first axis in a reversible and mobile manner, the mechanical connection being configured to prevent rotation of the mobile device with respect to the reservoir, the device being mobile with respect to the reservoir;
   a reader for reading an identifier on the reservoir;
   a motor with a power transmission shaft for interlocking with an engaging hub of delivery means on the reservoir and being configured for actuating delivery from the reservoir, the guiding rod being separate from the power transmission shaft such that the guiding rod and the guiding bore guide the mobile device up to or from the state where the power transmission shaft is interlocked with the engaging hub, the power transmission shaft having an axis of rotation parallel to the first axis such that the interlocking of the shaft with the engaging hub and the engagement of the guiding rod into the guiding bore are carried out in one translational motion along the first axis;
   a container for receiving the ingredient from the reservoir;
   a means of acquisition of a mass measurement of the ingredient delivered into the container;
   a controller configured to activate the motor to drive the delivery means when the guiding rod is sensed to interlock with the guiding bore and the ingredient is identified by the reader, the controller is configured to maintain the motor activated until the mass of the ingredient acquired by the means of acquisition is equal to the predetermined mass for the ingredient.

2. The device according to claim 1, which comprises at least two containers for receiving each ingredient to be measured out, and wherein, the controller is configured to activate, at each change of container, the motor when the reservoir of the ingredient to be measured out is identified by the reader for reading an identifier and the device is positioned opposite the reservoir, until the mass of the ingredient acquired by the scale is equal to the predetermined mass for the ingredient.

3. The device according to claim 2, which comprises the reader for reading an identifier of a container and wherein, each container comprises an identifier.

4. The device according to claim 1, which comprises wireless communication means, configured to receive at least one predetermined mass.

5. The device according to claim 1, which comprises a display for displaying at least one predetermined mass and/or at least one identifier of the ingredient to be measured out.

6. The device according to claim 1, wherein the mass measurement to be acquired by the scale is set to zero before the implementation of the motor.

7. The device according to claim 1, wherein the motor has speed that depends on the difference between the acquired mass and the predetermined mass of the ingredient.

8. The device according to claim 1, wherein the reader for reading an identifier induces an electromagnetic field.

9. A reservoir for holding an ingredient comprising:
a holder for holding a mobile device according to claim 1, said holder is configured for being slidably engaged by the guiding rod of the mobile device to allow slidably mounting the guide to the holder;
an opening having delivery means for delivering the ingredient out of the reservoir, said delivery means is configured for interlocking with a power transmission shaft of a motor on the measuring mobile device and for being activated by the motor with the power transmission shaft of the measuring mobile device; and
an identifier including identifying information of the ingredient contained by the reservoir, said information is configured to be detected by a reader of the measuring mobile device.

10. The reservoir according to claim 9, wherein the opening comprises a worm screw configured to be rotated by the motor with the power transmission shaft of the measuring mobile device.

11. The reservoir according to claim 9, wherein the opening comprises vibration means configured to be activated by the motor with the power transmission shaft of the measuring mobile device.

12. The reservoir according to claim 9, wherein the opening comprises a claw for grating and braking up the ingredient.

13. The reservoir according to claim 9, wherein the identifier comprises an electronic tag activated by an electromagnetic field.

14. A system for the measuring out of at least one ingredient contained in a reservoir, the system comprising:
a guiding bore mounted on the reservoir;
an opening having delivery means for delivering the ingredient out of the reservoir, said delivery means including an engaging hub;
an identifier including identifying information of the ingredient contained by the reservoir;
a mobile device for measuring out of at least one ingredient contained in a reservoir, said mobile device including:
a guiding rod having a first axis for slidably engaging into a guiding bore of the reservoir creating a sliding type mechanical connection along said first axis in a reversible and mobile manner, the mechanical connection being configured to prevent rotation of the mobile device with respect to the reservoir, the device being mobile with respect to the reservoir;
a reader for reading the identifying information on the identifier;
a motor with a power transmission shaft for interlocking with the engaging hub of the delivery means on the reservoir and for actuating delivery of the ingredient from the reservoir, the guiding rod being separate from the power transmission shaft such that the guiding rod and the guiding bore guide the mobile device up to or from the state where the power transmission shaft is interlocked with the engaging hub, the power transmission shaft having an axis of rotation parallel to the first axis such that the interlocking of the shaft with the engaging hub of the delivery means and the engagement of the guiding rod into the guiding bore are carried out in one translational motion along the first axis;
a container for receiving the ingredient from the reservoir;
a means of acquisition of a mass measurement of the ingredient delivered into the container;
a controller configured to activate the motor to drive the delivery means when the guiding rod is sensed to interlock with the guiding bore and the ingredient is identified by the reader, the controller is configured to maintain the motor activated until the mass of the ingredient acquired by the means of acquisition is equal to the predetermined mass for the ingredient.

15. The system according to claim 14, wherein the mobile device is powered by electric current and the holder, delivery means and the identifier including identifying information of the ingredient contained by the reservoir are electrically passive.

16. The system according to claim 14, which further comprises a rail, arranged opposite to at least one reservoir, the rail comprising a shifter for moving the device over the rail.

17. A method for measuring out at least one ingredient contained in a reservoir and being associated with a predetermined mass, comprising the following steps:
slidably engaging a mobile measuring device to the reservoir in a way so as to create a mechanical connection configured to prevent rotation of the mobile measuring device with respect to the reservoir, by sliding a guiding rod of the mobile measuring device in a guiding bore of the reservoir along a first axis in a reversible and mobile manner, the device being mobile with respect to the reservoir;
interlocking a power transmission shaft of a motor of the measuring device with an engaging hub of a delivery means on the reservoir, the guiding rod being separate from the power transmission shaft such that the guiding rod and the guiding bore guide the mobile device up to or from the state where the power transmission shaft is interlocked with the engaging hub, the power transmission shaft having an axis of rotation parallel to the first axis such that the interlocking of the power transmission shaft with the engaging hub of the delivery means and the engagement of the guiding rod into the guiding bore are carried out in one translational motion along the first axis;
detecting identifying information of the ingredient by reading an identifier on the reservoir;
delivering the ingredient from the reservoir to a container in the measuring device by actuating the delivery means with the motor with the power transmission shaft;
acquiring of a mass measurement of the ingredient delivered into the container,
wherein said step of delivering is carried out by activating the motor of the device when the ingredient to be measured out is identified and when the guiding rod is sensed to interlock with the guiding bore, until the mass of the ingredient delivered into the container is equal to the predetermined mass for the ingredient.

* * * * *